United States Patent

[11] 3,565,391

| | | |
|---|---|---|
| [72] | Inventor | Benito C. Zannini<br>Cranston, R.I. |
| [21] | Appl. No. | 762,495 |
| [22] | Filed | Sept. 25, 1968 |
| [45] | Patented | Feb. 23, 1971 |
| [73] | Assignee | International Telephone & Telegraph Corporation<br>New York, N.Y. |

[54] PNEUMATIC VALVE POSITIONER
10 Claims, 11 Drawing Figs.

[52] U.S. Cl. ................................................. 251/28
[51] Int. Cl. .............................................. F16k 31/12
[50] Field of Search ...................................... 251/28;
137/85

[56] References Cited
UNITED STATES PATENTS

| 2,240,244 | 4/1941 | Cook................... | 137/85X |
| 2,298,112 | 10/1942 | Edwards et al. .............. | 251/28X |
| 2,638,875 | 5/1953 | Bowditch et al. ............. | 137/85X |
| 2,911,954 | 11/1959 | Huston et al.................. | 137/85X |
| 2,942,581 | 6/1960 | Gaffney........................ | 137/85X |
| 3,145,722 | 8/1964 | Mueller........................ | 251/28X |
| 3,313,212 | 4/1967 | Baker et al.................... | 137/85X |
| 3,428,069 | 2/1969 | Undery......................... | 137/85 |

Primary Examiner—Arnold Rosenthal
Attorneys—C. Cornell Remson, Jr., Walter J. Baum, Rayson P. Morris, Percy P. Lantzy, J. Warren Whitesel and Delbert P. Warner ABSTRACT: A pneumatic valve positioner includes a balanced beam floating on three points, each point being able to undertake a mechanical excursion. One point moves as a function of an input signal, one as a function of a nozzle pressure signal, and one as a function of a feedback assembly. A flapper riding on the balanced beam controls the output signal by varying the back pressure behind the nozzle. When all three points are in a mechanical balance, the flapper maintains a "normal" or equilibrium back pressure behind the nozzle. If any one point moves, the flapper shifts its position and allows the back pressure to change behind the nozzle, thereby commanding a variation in the output until the feedback signal moves another point to shift the flapper back to essentially its original position to maintain equilibrium.

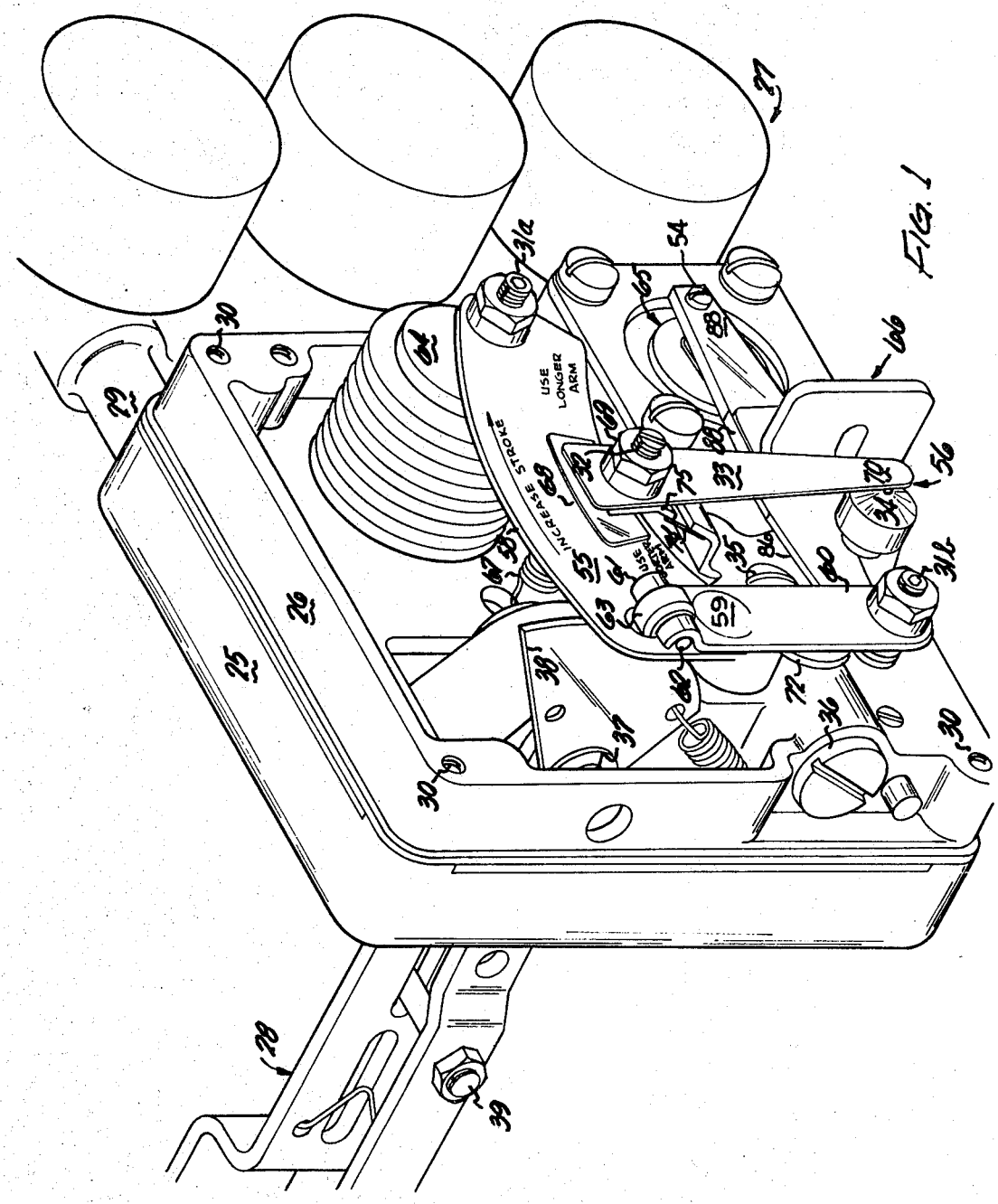
FIG. 1
INVENTOR
B. C. ZANNINI
ATTORNEY

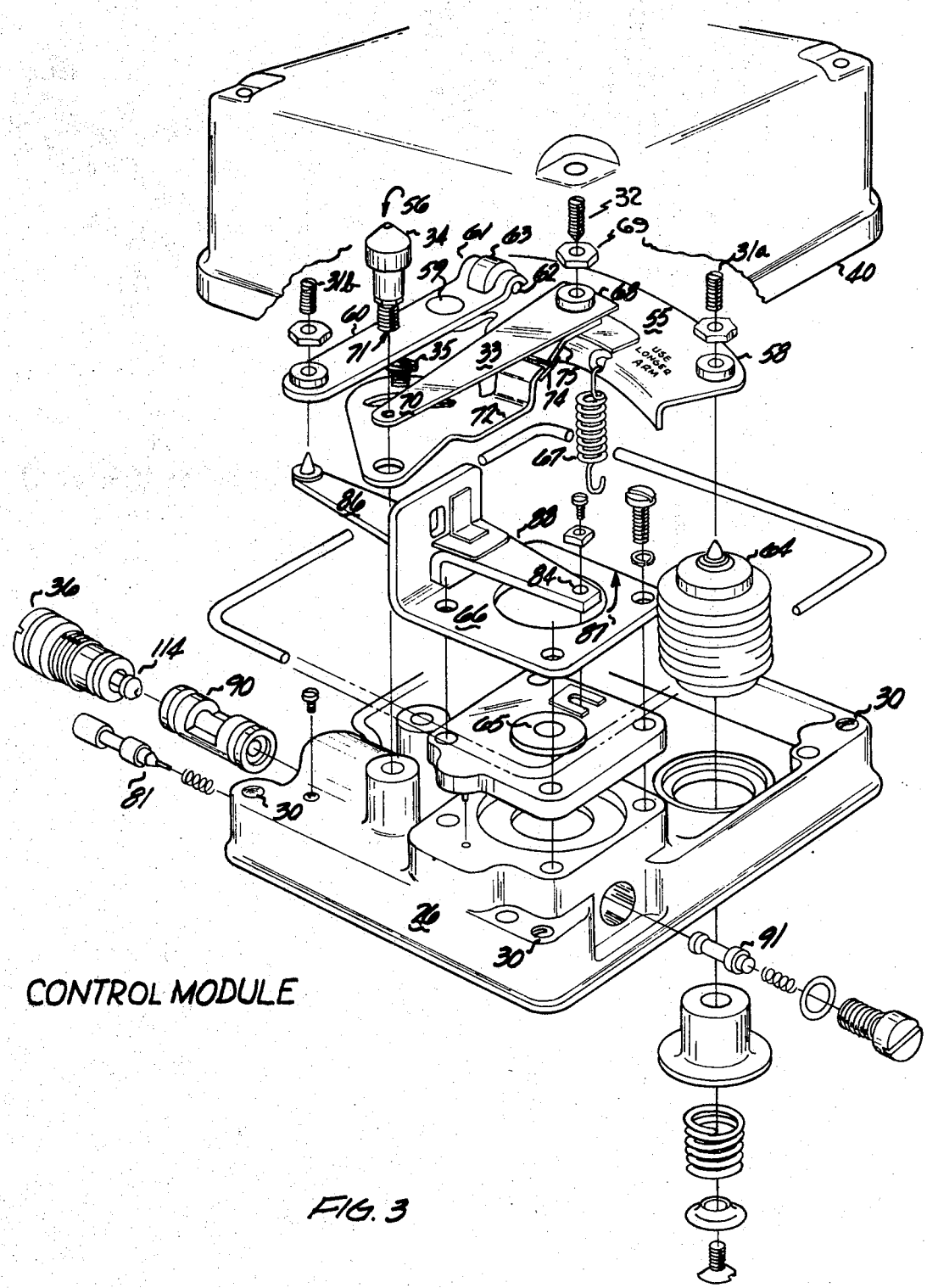
FIG. 3 CONTROL MODULE

INSTRUMENT INPUT SIGNAL

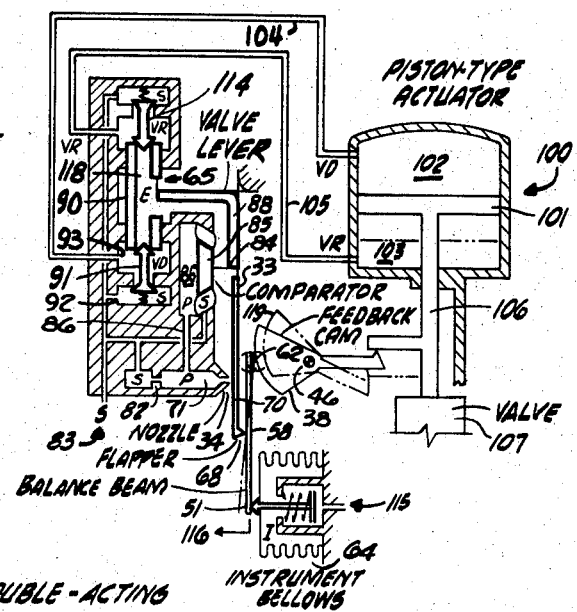

PNEUMATIC VALVE POSITIONER

This invention relates to pneumatic valve positioners and more particularly to positioners using a balance of motion principle to combine three variables.

As used herein, the term "valve positioner" refers to an instrument which commands a part to undertake a mechanical motion or excursion responsive to an input signal, the signal being in the form of a gas supplied to the instrument at a certain signal pressure. Depending upon the actual gas pressure of the received signal, the instrument sends a command signal which causes the mechanical part to undertake such motion and to assume a given position. As the part moves, it mechanically relocates a reference point on the instrument to feed back a signal confirming that the commanded motion has, in fact, taken place, and that the moving part has reached the desired location. This combination of motion followed by a feedback of motion suggests the descriptive name "balance of motion."

The invention uses a nozzle-flapper assembly for generating a command signal. In greater detail, the flapper covers or uncovers a nozzle leading to a pneumatic chamber to change the back pressure in the chamber by a degree which reflects the summation of the input signal, the output signal, and the feedback signal. If there is a motion which is not counter balanced by a motion responsive to at least the input signal or the feedback signal, the flapper partly uncovers the nozzle and changes the chamber pressure to cause one or more of the other two signals to be corrected until the position of the flapper reaches a point, with respect to the nozzle, which restores equilibrium.

Instruments of the described type have generally suffered from two major defects. First, the response time has tended to be rather slow relative to what it could be, and second, when attempts were made to speed up the response, there was a tendency to overshoot with a reaction wherein there was an oscillation or hunting motion. These instruments have tended to become very expensive when complexities were introduced to overcome the foregoing and other problems.

Accordingly, an object of the invention is to provide new and improved valve positioners. Here an object is to speed the instrument's response time and increase the instrument's gain without causing a danger of overshooting, hunting or other general instability. Conversely, an object is to preclude hunting despite a fast response.

Another object is to provide a superior instrument enabling more accurate settings.

Yet another object of the invention is to provide a superior valve control instrument having a high degree of resolution, sensitivity, and stability. Still another object is to provide these and other desirable features in an instrument having a simple span or range of output adjustment settings without sacrificing stability.

A further object of the invention is to provide a device which can be installed very easily in the field for use with direct-acting, reverse-acting, double-acting, or single-acting valve positioning operators. Here an object is to provide a basic control device which is interchangeable with other basic control devices having general utility in many applications. Still another object is to provide such a basic control device in a modular form so that the control module (FIG. 3) device may be removed for any desired purpose, such as repair or maintenance without the necessity of disconnecting either the cam feedback mechanism from the valve or other devices or the various gas fittings and connections.

Still another object is to provide for all of the foregoing objects at a low cost and with a very simple device. Here, an object is to provide an instrument which can be made on general purpose machines without requiring an undue number of special purpose parts, tools, jigs, and dies.

In keeping with an aspect of the invention, the instrument includes a flapper assembly riding on a freely floating balance beam or plate, free of any fixed points. The flapper is positionable on the beam to provide a span or range of output adjustment. Three points on the balance beam are supported by and ride on movable elements such as expandable bellows, air relays, or moving cams. The input signal expands or contracts the bellows to move the beam and cause an air relay response for providing an output command signal which drives the moving part. As the part moves, it turns the cam to generate a feedback signal and move the beam back to normal. Hence, the balance beam is always floating in a position which represents a summation of these variables. A flapper attached to the floating beam opens and closes the nozzle to vary the chamber pressure behind the nozzle, and that chamber pressure controls the operation of the air relay. The change in chamber pressure causes the air relay to give a variation in the output command signal. The commanded part moves until the feedback cam rocks the balance beam to a position wherein the flapper closes the nozzle to a degree which restores the equilibrium of the motion balance system.

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 is a perspective view of the completely assembled inventive instrument;

FIG. 3 is an exploded view of the control module shown in FIG. 1;

Figure 4:
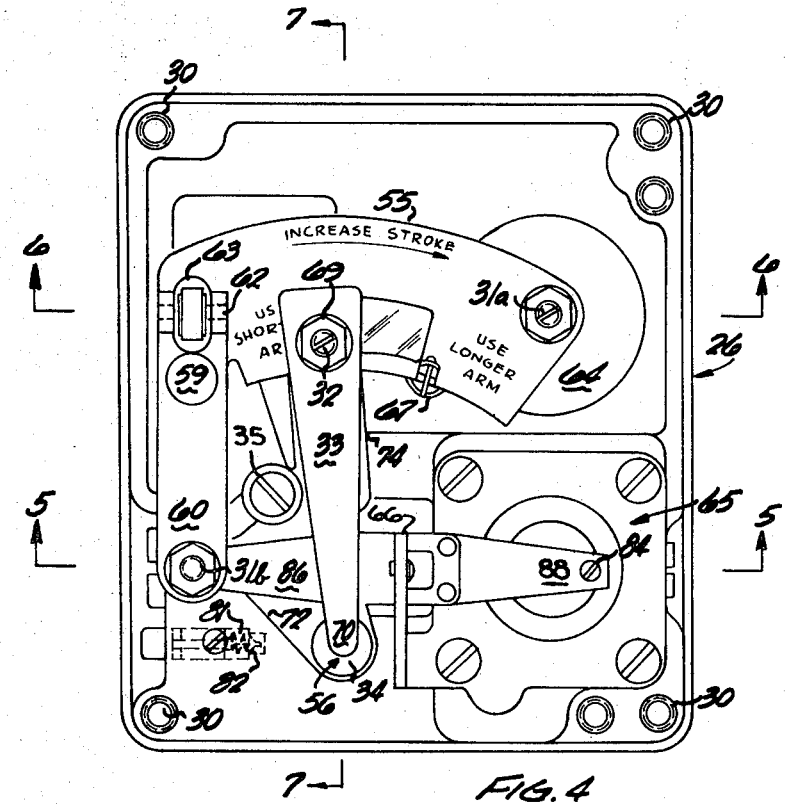
FIG. 4 is a top plan view of the control module.
Figure 5:
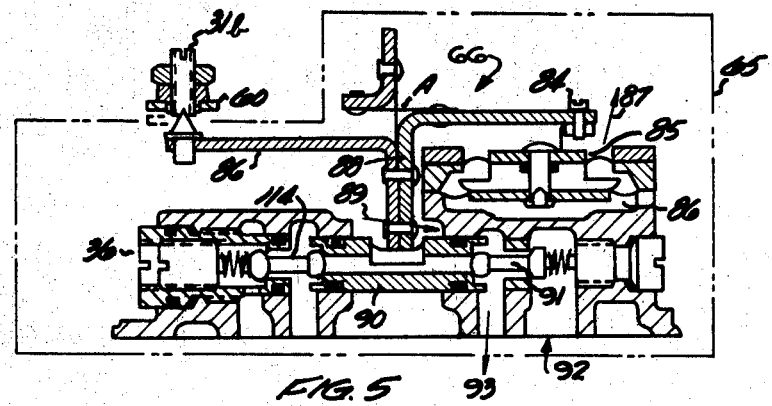
Figure 6:
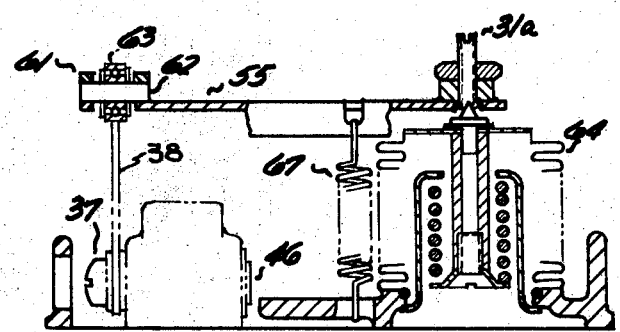
Figure 7:
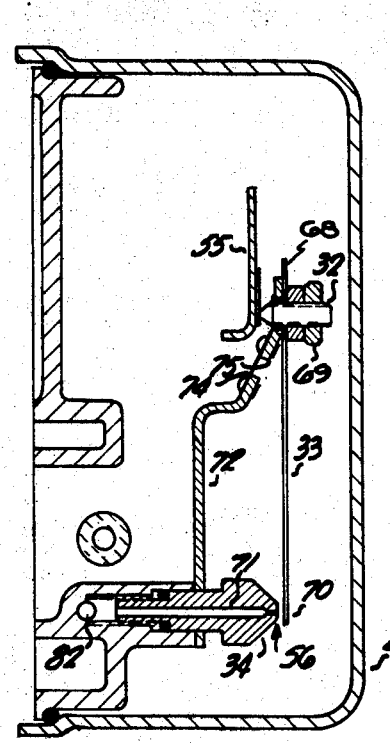
Figure 11:
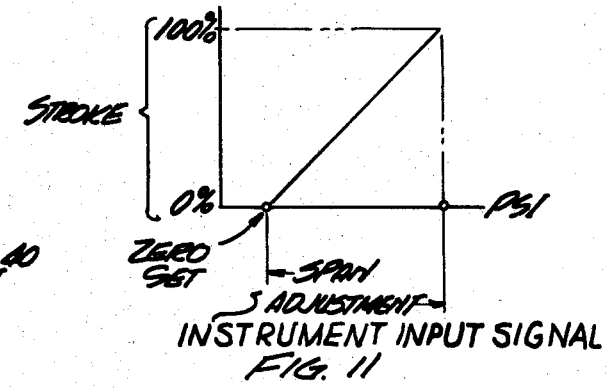

FIGS. 5—7 are cross-sectional views taken from FIG. 4 along the lines 5-5, 6-6, and 7-7 respectively;

FIGS. 8 and 9 are schematic views of a double-acting and a single-acting positioner, respectively;

FIG. 10 is a system view showing an exemplary use of the invention to control a fluid flow; and FIG. 11 is a graphical showing of a span setting which is useful for explaining an adjustment of the control module.

The inventive instrument of FIG. 1 includes four major assembly sections which are: a manifold assembly 25, a control module 26, a number of dials or gages 27, and a feedback arm 28.

The manifold assembly 25 is mounted in any suitable manner at the point of operation with all permanent connections made thereto. These permanent connections include all air or gas lines, such as at 29, and mechanical attachments to the controlled part, as at 28. Hence, the control module 26 may be removed and carried away from the manifold assembly 25 by simply removing four bolts from the holes 30. When the control module is returned to the manifold, it will only be necessary to make a fine adjustment.

The three gages 27 indicate input, supply, and output air or gas pressure.

FIG. 1 also shows the various adjustments which may be made. Two setscrews 31a, 31b are adjusted at the factory to level a balance beam and bring the entire assembly into an operative range — it is not normal to readjust these settings thereafter. A setscrew 32 on a flapper 33 provides a coarse adjustment for field installers. A nozzle 34 is threaded to screw into and out of the control module to provide a fine adjustment, after the setscrew 32 is clamped in place, to adapt the instrument to operate at a particular installation.

A lockscrew 35 enables the flapper 33 to swing over an arc centered at the nozzle to adjust the span or range of output signals. Thus, looking at FIG. 11, one sees a zero point which is first set by adjustments at 32 and 34; then, lockscrew 35 is loosened, and the end of flapper 33 is moved as indicated by the notation "Increase Stroke" until there is a desired full scale stroke. There, lockscrew 35 is tightened. Hence, the stroke adjustments adapt the instrument to make the full scale of flapper movement responsive to the full range of mechanical motion expected from a commanded part — which may vary from installation to installation.

A setscrew 36 enables a balance of pressure adjustment for double-acting positioners. A setscrew 37 allows a position adjustment of a feedback cam 38. A bolt 39 allows a feedback lever arm to be lengthened or shortened, as required, by any particular installation.

Finally, a cover (40, FIG. 3) goes over the entire control module and seals the module to the manifold assembly 25. When so sealed, none of the adjustments may be changed. Thus, the settings are guarded against inadvertent readjustments.

Figure 2:
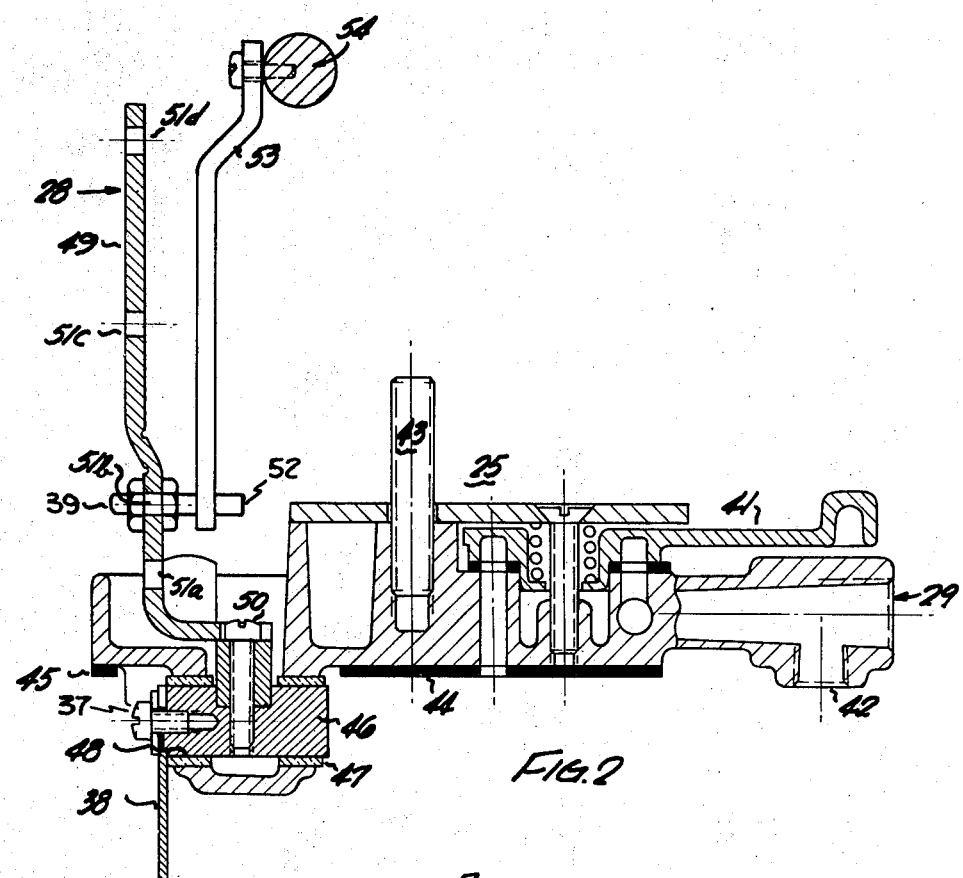
FIG. 2 is a cross section view of a manifold assembly showing a manually controlled air valve and a feedback mechanism.

The manifold assembly 25 is best seen in FIG. 2. There is a block of metal or other suitable material, having therein a number of holes or passageways for air or gas. A suitable valve 41 may be rotated manually to open or close these passageways. Thus, the valve 41 may be closed, and the control module may be removed and replaced. Then the valve 41 may be opened again to put the module back into service. If desired, the valve 41 may also bypass the control module so that the part subject to the commanded operation will not be made inoperative during the periods while the control module is removed.

At 42, one of the passageways is branched to provide for making a gage connection. Other gage connections are made in similar manners.

A pin 43 is one of several which help fix the location of the manifold assembly on the controlled part.

A heavily inked line 44, 45 represents a machined metal face which fits against a similarly machined metal face on the control module. Thus, when bolted together, the manifold and control module meet each other, very precisely, in face-to-face, metal-to-metal contact.

The feedback assembly 28 includes a short shaft 46 mounted, at either of its ends, on two bearings 47, 48. An actuator arm 49 is bolted at 50 to the shaft 46. Thus, as the arm 49 is raised or lowered (moved above or below the plane of the drawing, as viewed in FIG. 2), the shaft 46 rotates to turn the cam 38. Ideally, the assembly 46—49 is made as compact as possible to eliminate twisting or other forms of lost mechanical motion.

A number of holes 51a—51d are formed in the arm 49 to enable a lever arm length selection. Thus, a pin 52 is here shown as passing through the hole 51b so that the arm 49 is shown as having its second from shortest effective length. If the pin 52 were moved to hole 51d, for example, arm 49 would have its longest effective length.

Attached to the pin 52 is an arm 53 leading to a shaft 54 (seen in cross section) of the commanded mechanical part. For example, assume that shaft 54 is the stem of a valve. If the valve has a very short stroke between fully opened and closed positions, arms 49, 53 are joined together by pin 52 passing through the hole 51a. If the valve has a very long stroke, the arms 53, 49 are joined by the pin 52 passing through the hole 51d. Hence, within reason, the shaft 46 experiences approximately the same rotation responsive to a full scale valve movement regardless of the length of the valve stroke.

Attached to and moving in unison with shaft 46 is a cam plate 38 which is cut with a contour that complements the valve stroke and pin 52 position. Hence, substantially all valves give similar feedback. For example, a 10 percent valve motion at any point in its range of possible motion should cause the effect point on the cam 38 surface to move up or down by a corresponding 10 percent. Of course, the designer may also provide other motion feedback relationships by specifying any cam contour, as required. Thus, he could cut the cam to give a greater than average feedback at one end of the range of valve motion and a less than average feedback at the other end of the range of valve motion, with no feedback in the midrange. Obviously, still other arrangements may be provided.

The nature of the control module assembly may become more apparent from a study of FIGS. 3—7. In greater detail, the perspective and exploded views (FIGS. 1 and 3) show a valve positioner including any suitable instrumentation having a floating balance beam or plate assembly 55, and a flapper-nozzle assembly 56. The assembly 55 includes a first plate 58 riveted at 59 to a second plate 60 to provide a generally L-shaped. The ends of the plate 60 are arched to provide a bearing for receiving and supporting an axle 62 of a wheel 63. The plate 55 is supported at three floating points 31a, 31b, and 62. The point 62 is the axle of the wheel 63 that rides on the cam 38 turned by shaft 46. The points 31a, 31b are resting on the top of expandable bellows 64 and an air relay 65, both of any suitable and known design. The coupling between point 31b and air relay 65 is made via an extended lever arm assembly 66. This arrangement enables the cam 38-wheel 63 point of contact to be intermediate the two point couplings 31a, 31b in order to reduce drift, wobble, or binding of the wheel. A coil spring 67 pulls downwardly upon the balance beam plate assembly 55 to hold it in a positive contact with these three floating points 31a, 31b, 62.

By inspection, it should be apparent that if the point 31a moves up or down, the balance beam plate assembly 55 rocks about an axis through the points 31b, 62. If the point 31b moves up or down, the balance beam plate assembly 55 rocks about an axis through the points 31a, 62. If the point 62 moves up or down, the balance beam plate assembly 55 rocks about an axis through the points 31a, 31b. If two or three points move substantially simultaneously or sequentially, the balance beam plate assembly 55 rocks and comes to rest in a place which is a resultant of these two or three movements. The relative sensitivity of the plate to movement at any one point as compared to the movement at the other of the three points may be selected by choosing a proper length for the three lever arms: 31a, 62; 62, 31b; and a line from point 62 perpendicular to a line through the support points 31a, 31b.

Riding on and rocking with, the plate assembly 55 is the flapper lever arm 33. One end 68 of arm 33 rides on a pivot point at the end of setscrew 32 which may be adjusted and then locked in position by turning a nut 69. The other end 70 of the arm 33 is positioned above the nozzle 34 leading to a pressure chamber 71 (seen in FIG. 7 and 8). The flapper arm 33 is supported by a plate 72 which swings about a pivot point at the nozzle 34 to a position where it is fixed in place by the lockscrew 35 fitting into an accurate slot in plate 72. Mounted on the free end of plate 72 is an upstanding leaf member 74 riveted to another member 75 which helps form the arm 33. The compliance thus given to the arm 33 is selected to give a reliable flapper operation, and yet to allow enough resilience to avoid damage when the arm strikes the nozzle. To adjust the length of the flapper stroke relative to the balance beam motion, it is only necessary to loosen the lockscrew 35 and adjust the position of the plate 72.

The nature of the flapper-nozzle assembly is most apparent from a study of FIGS. 7 and 8. The end 70 of the flapper arm 33 covers an orifice in nozzle 34 leading to a back pressure chamber 71 having a lower end partly closed by a restrictor 82 (FIGS. 4, 8) with a relatively small orifice therein. An air supply 83 is coupled through restrictor 82 to the back pressure chamber 71, as indicated in FIGS. 8, 9. The restriction at 82 allows the air pressure in the chamber 71 to drop when the flapper 33 is moved (responsive to the rocking of the balance beam plate assembly 55) away from the orifice in nozzle 34 and allows the pressure to rise when the flapper is moved toward the nozzle (responsive to a rocking of balance beam plate assembly 55.)

The air relay (enclosed in dot-dashed rectangle 65, FIG. 5) is a device for comparing two gas pressures, as best shown in FIGS. 5 and 8. In the schematic disclosure of FIG. 8, one pressure P is the back pressure in chamber 71 of the nozzle and the other pressure S is the supply pressure. The comparator includes a diaphragm stack 85 which moves up and down responsive to the nozzle back pressure P changes appearing in the chamber 86 as compared with the supply pressure S. If, for example, the balances of gas pressure are upset in the chamber 71 and the diaphragm assembly 85 moves downwardly or upwardly, the point 84 goes down or up, and this—acting through lever arm 86—rocks the balance beam plate assembly 55.

Assume that diaphragm stack 85 raises the point 84. The end of pivoted lever 86 rises as indicated by arrow 87, the arm 86 pivots about point A formed by two flexure strips, and the point 31b moves downwardly. The armature valve lever 88 also rotates about the pivot point A. The opposite end of the armature valve lever moves to the right in the direction of the arrow 89 and slides a sleeve 90 to the right. This sliding sleeve opens a valve in the form of a spring-biased poppet or piston 91 to connect the air supply passage 92 to the output passage 93. The output from passage 93 is connected to means (100, FIGS. 8 or 9) for moving the controlled mechanical part in one direction. As that part moves, the shaft 46 rotates, and the feedback cam 38 turns. The shape of the cam is selected to coincide with the desired movement of the mechanical part. Thus, when the pressure in the passage 93 causes exactly the intended amount of movement, the cam 38 returns the balance beam plate assembly 55 to equilibrium, the flapper-nozzle 56 relationship is again normal, and poppet or piston 91 closes passage 92 to block the output of gas.

The air relay 65 provides an output used to drive either a double-acting or a single-acting piston or diaphragm actuator, shown schematically in FIGS. 8 and 9, respectively, each of which shows an actuator 100.

In FIG. 8, the double-acting actuator 100 includes a piston 101 adapted to slide up or down in a two-sided cylinder, thereby forming two air chambers 102, 103, above and below the piston, respectively. The chambers 102, 103 are connected to the air relay 65 via air lines 104, 105. Depending upon movement of sleeve valve 90, the pressure may be increased in either one of the chambers 102, 103 and decreased in the other. The piston 101 responds thereto by sliding up or down to reestablish the gas pressure equilibrium in the two chambers 102, 103 and to move the arm 106. Arm 106 raises or lowers a mechanical part 107 whose movement is controlled by the valve positioner.

The single-acting valve actuator 100 (FIG. 9) includes a diaphragm plate 111 which is biased or pushed upwardly against the air pressure in chamber 102 by the force of a return spring 112. As the air relay sleeve valve 90 moves the air pressure in line 104 (and in chamber 102) increases or decreases, and the diaphragm plate 111 assumes a new position of equilibrium with respect to the forces of the spring 112 acting upwardly against the bottom of diaphragm plate 111. The results of movement of the shaft 106 are similar to those described in connection with the movement of shaft 106 in FIG. 8.

The double-acting actuator (FIG. 8) operates this way. Supply pressure gas 83 is directed to both booster valves 91, 114, and it also bleeds constantly thru the nozzle 34, chamber 71, and its restrictor 82. Because the flow resistance thru restrictor 82 is constant, nozzle back pressure increases (or decreases) in chamber 71 as nozzle flow resistance is increased (or decreased) by a motion of the flapper 70 as it moves closer to (or away from) the nozzle 34. An increase (for example) in the control signal pressure 115 produces a motion 116 at one end of the balance beam plate 55. A portion of this motion is transmitted to the flapper arm 33, causing the flapper to move toward the nozzle 34. This increases the back pressure in chambers 71 and 86, thus moving the diaphragm stack 85 of the air relay 65 to the right. Via the flexure-mounted valve lever 88, this diaphragm motion causes a shifting of the valve sleeve 90 downwardly, opening valve 91 to connect the air line 104 to the supply pressure 83. Reverse valve 114 opens to an exhaust port 118, for evacuating the chamber 103. Accordingly, the actuator piston 101 moves downwardly. This downward movement turns feedback cam 38 until the mechanical motion drives the cam to a position 119 which changes the support point 62 at the other end of the balance beam 55 to nullify the effects of the motion produced by the input signal acting on the instrument bellows 64. The nozzle clearance is thus restored to essentially its original value; the air relay diaphragm 85 and valves return to their normal equilibrium position.

Because of its extremely high gain, the system, as described above, might tend to overshoot the equilibrium point and go into oscillation if there is no correction. Accordingly, the motion of the diaphragm stack 85 in the air relay 65 is transmitted, at point 31b, to the balance beam plate assembly 55 and the flapper arm 33 to modify its motion and thereby induce stability in the instrument. One of the valves 91, 114 is axially adjustable (as at 36) to attain a desired operating pressure level in both sides of the actuator piston 101.

The span or range adjustment for any given instrument pressure change is adjusted by changing the location 32 at which the flapper contacts the beam assembly 55. First, the zero point (FIG. 11) is set by turning the nozzle, the lockscrew 35 is loosened and plate 72 is rotated to select the span or full scale range for the desired amount of beam assembly 55 motion, and then lockscrew 35 is tightened to maintain the selected span adjustment.

The single-acting actuator (FIG. 9), operates the same as the double-acting actuator operates except that valve 114 is removed and the corresponding exhaust port is plugged at 120. The spring 112 provides the function of the exhaust air line 105.

FIG. 10 shows an exemplary system incorporating the invention. The inventive features, described above in connection with FIGS. 8 and 9, are schematically represented in a box 125 marked "FIG. 8 or FIG. 9." Reference numerals may be compared to identify the parts described above.

A process line 120 includes a valve 107 for controlling a flow of any suitable material. Purely by way of example, supply line 120 could be viewed as an oil pipe line in which predetermined oil pressure must be maintained at all times. Hence, the control problem presented by this example is to modulate the setting of valve 107 as a function of the oil pressure prevailing in the line 120.

The valve modulating control system comprises a sensor 121, a source or supply of air 122, a pressure transmitter 123, a pneumatic controller 124, and the valve positioner and instrument combination 125. The nature of the sensor 121 is not material—in the exemplary case of an oil pipe line pressure monitor, it would be a pressure detector of any known design. The pressure transmitter 123 provides a well regulated output air supply at 126 which has a pressure that varies as a function of the process line pressure, as sensed at 121. The pressure at 126 acts as an input signal for the controller 124, again this may be any suitable known device. A suitable hand knob may be provided at 124 to set the response point or threshold of the system. The pneumatic controller 124 modifies the input signal appearing at 126 by modulating the flow of air from source 122 through box 124 to input 115 on the instrument of FIG. 1. For example, the air pressure at 115 may have any signal value in the range from 3 to 15 pounds per square inch.

The instrument of FIG. 1 responds to the pressure of the input signal at 115 by connecting the supply 122 to the air line 104 and sending an output signal to the positioner 100. The valve positioner 100 opens or closes the valve 107 by a degree which is necessary to restore the pressure in the process line 120. As the valve 107 opens or closes, a signal is fed back at 38 to indicate the instantaneous valve position. When the feedback at 38 and the input signal at 115 are in balance, as programmed by the zero set point and span adjustments, the valve 107 has assumed a position whereby the pressure in process line 120 stands at desired regulated value.

While the principles of the invention have been described above in connection with specific apparatus and applications, those who are skilled in the art will readily perceive other uses for the inventive device. Accordingly, it is to be understood that this description is made only by way of example and not as a limitation on the scope of the invention. The attached claims should be construed broadly enough to cover all equivalents reasonably falling within the true spirit and scope of the invention.

I claim:

1. A pneumatic valve positioner including a balanced beam freely floating on three points, means for moving one of said three points responsive to an input signal, means for moving a second of said three points responsive to a command for an output signal, means for moving a third of said three points as a feedback signal responsive to the response to said output signal, a flapper-nozzle assembly, said flapper being positioned by said freely floating balanced beam, and means responsive to nozzle back pressure controlled by said flapper for generating said command for an output signal, wherein said balance beam has a generally L-shaped configuration, two of said floating points being near the ends of the arms forming said L-shape, and the third of said floating points being near the apex of said L-shape.

2. A pneumatic instrument for controlling a valve position comprising an expandable bellows or diaphragm, means for applying an input signal as a predetermined gas pressure in the bellows or diaphragm to raise or lower a point on the bellows or diaphragm, a freely floating balance beam plate resting at one floating point on said bellows, said plate rocking about one axis responsive to the signal pressure change in said bellows, a flapper-nozzle assembly controlled by said rocking plate, means responsive to nozzle back pressure for changing the position of a second floating point on said plate and rocking the plate about another axis while sending an output signal to cause a mechanical motion of said valve, a cam for rocking said plate about a third axis, and means responsive to the mechanical motion of said valve for turning the cam to coincide with the desired mechanical valve motion, said means responsive to the nozzle back pressure continuing the mechanical valve motion until the plate returns to a normal floating orientation and the flapper-nozzle assembly back pressure returns to equilibrium after all three of said points are in motion balance.

3. The instrument of claim 2 and wherein said means responsive to the nozzle back pressure includes a lever arm for transmitting an immediate signal to the second freely floating point on the balanced beam to modify the beam motion and maintain stability.

4. The instrument of claim 3 and at least one pneumatic chamber, said means responsive to the nozzle back pressure changing the pressure in said chamber, and means responsive to said change in pressure for causing said movement of said valve.

5. A pneumatic instrument comprising a manifold assembly and a control module assembly, means for permanently connecting said manifold assembly to a control device, means for removably connecting said module assembly to said manifold assembly, and means for pneumatically and mechanically intercoupling said assembly to interact with and control said device, wherein said pneumatic intercoupling between said manifold and control assemblies includes at least one gas passageway communicating between said assemblies, a balanced beam freely floating on three points, means for moving one of said three points responsive to an input signal, means for moving a second of said three points responsive to a command for an output signal, said manifold assembly including means which are independent of said control module for mechanically moving a third of said three points as a feedback signal responsive to the response to said output signal, a flapper-nozzle assembly on said control module, said flapper being positioned by said freely floating balanced beam, means responsive to nozzle back pressure controlled by said flapper for generating said command for an output signal, and valve means on said manifold assembly for closing the passageway providing communication between said manifold and control module when said control module is removed from said manifold.

6. The valve positioner of claim 5 wherein said third floating point moving means comprises a cam operated responsive to output signals commanded by changes in the nozzle back pressure.

7. The valve positioner of claim 6 and means for making any of a plurality of said manifold assemblies interchangeable with any of a plurality of said control modules by changing said cam and selecting the length of a lever arm coupling said controlled device to said cam, said coupling being operated responsive to said output command signals.

8. A pneumatic valve positioner including a balance beam freely floating on three points, an expandable bellows coupled to an air supply for moving one of said three points responsive to an input signal, an air relay means for moving a second of said three points responsive to a command for an output signal, means for moving a third of said three points as a feedback signal responsive to the response to said output signal, a flapper-nozzle assembly, said flapper being positioned by said freely floating balance beam, means responsive to back pressure in said nozzle, said back pressure controlled by said flapper, said back pressure generating said command for an output signal and controlling said air relay means, means coupled between the second point and said air relay means for moving said second point until said air relay means reaches equilibrium, a double-acting actuator having a piston which moves in either of two directions between two air chambers formed on either side of the piston, a source of gas, means responsive to the air relay for connecting said two chambers to said source of gas for selectively increasing the pressure in either one of the chambers and decreasing the pressure in the other chamber as a function of the back pressure of said nozzle, and means for moving a mechanical part responsive to the resulting movement of said piston.

9. The positioner of claim 8 and means immediately responsive to the motion of the air relay for modifying the movement of the balance beam to maintain stability.

10. The valve positioner of claim 8 wherein said third floating point moving means comprises a cam moved responsive to said responsive to said output signal.